United States Patent [19]
Doeg

[11] 4,105,301
[45] Aug. 8, 1978

[54] CAR MIRROR WITH U-SHAPED SLOT MEANS AND SOLENOID CONTROL

[76] Inventor: Ralph W. Doeg, 125 56th Ave. South, St. Petersburg, Fla. 33705

[21] Appl. No.: 741,616

[22] Filed: Nov. 15, 1976

[51] Int. Cl.² .............................................. G02B 5/08
[52] U.S. Cl. ................................................ 350/289
[58] Field of Search ............ 350/289, 279; 74/501 M; 248/484

[56] References Cited
U.S. PATENT DOCUMENTS

| | | | |
|---|---|---|---|
| 2,718,175 | 9/1955 | Gim | 350/289 |
| 3,199,075 | 8/1965 | Simmons | 350/289 |
| 3,486,811 | 12/1969 | Russell | 350/289 |
| 3,640,608 | 2/1972 | McKee et al. | 350/289 |
| 3,820,877 | 6/1974 | Moyer | 350/289 |
| 3,890,848 | 6/1975 | Clontz | 74/501 M |

*Primary Examiner*—Jon W. Henry
*Attorney, Agent, or Firm*—Stein & Frijouf

[57] ABSTRACT

A car mirror angling device designed to eliminate "blind spots" in rearward viewing. The device utilizes a solenoid connected to a rotatable post. Actuation of the solenoid rotates the post, which in turn, pivots the mirror. The pivot angle is adjustable by means of thumb screws which are presettable by the driver.

8 Claims, 5 Drawing Figures

CAR MIRROR WITH U-SHAPED SLOT MEANS AND SOLENOID CONTROL

BACKGROUND OF THE INVENTION

1. Field of the Invention

This invention relates to a car mirror angling device which pivots its mirror through a presettable angle upon actuation of a solenoid. More particularly, this invention relates to apparatus for limited angling of a car mirror by actuation of a solenoid to overcome "blind spots." Such spots are encountered with ordinary mirrors as a vehicle overtakes the car upon which the ordinary mirror is mounted.

2. Description of the Prior Art

In automobiles, trucks, etc., a hazard exists due to the lack of complete rear view visibility. These are "blind spots" in the rearview mirror employed.

Efforts have been made to increase the degree of this visibility. These efforts primarily involved the positioning of mirrors both on the inside and the outside of the vehicle. The fixed mirrors employed usually consisted of a reflecting element mounted on a ball and socket arrangement. The driver twisted the mirror element into a position which would give him the most advantageous view. Unfortunately, because these mirrors were usually fixed, they could only overcome a portion of the blind spots.

To add versatility to the mirrors, angling devices were designed which enabled the mirror to oscillate on its support. These angling devices were incorporated into the mirror housing to tilt the reflecting element in a desired direction. Some of them oscillated thereby to scan the rear view and hopefully eliminate blind spots. U.S. Pat. Nos. 3,199,015, 3,486,811 and 3,519,335 were based on this theory. All three were operated to tilt the mirror in either a left or right direction by actuation of the vehicle's turn signal lever. Unfortunately, all were not only quite bulky in structure, but also failed to eliminate blind spots because they were designed to be mounted on the inside of the car.

Subsequently other angling devices were designed to be used on the outside of the car. U.S. Pat. No. 3,799,658 is typical. There an outside, continuously oscillating, mirror scans the field of vision. Unfortunately, the device of said patent only works under ideal conditions. At the preferred oscillatory rate (15 to 20 RPM), the rate of scan is too slow so that an oncoming vehicle is occassionally allowed to "slip by" without being seen. If the oscillating rate is increased, the driver's eyes cannot keep track of the mirror. Therefore, this type of continual oscillation only creates a false sense of security and does not alleviate the problem.

An object of this invention is to eliminate blind spots commonly present in vehicles.

Another object is to provide a simple and compact structure for a car mirror to overcome blind spots.

Another object is to provide a car mirror of such type suitable for numerous drivers.

A further object is to provide apparatus to tilt the mirror only at the driver's will.

Other objects of the invention will in part be obvious and will in part appear hereinafter.

SUMMARY OF THE INVENTION

A car mirror angling device has now been invented for eliminating blind spots. "Blind spots" usually occur on both sides of a vehicle close to the rear wheels. The device is mounted on the outside of the car and positioned near the front of the side window. The driver manually operates the device to pivot the mirror between two positions. The first position is the conventional viewing position whereby the driver sights rearwardly down the side of the car. In the second position, the mirror is pivoted to a "far" left or right position. The driver then can view what would normally be his blind spot dependant upon the side upon which it is mounted.

Under normal driving conditions, the mirror remains in its first position whereby it is used identically to the conventional fixed mirror commonly found on most automobiles. Upon turning or passing, the driver checks his blind spot by actuating the device of this invention thereby pivoting the mirror to see if there are any hidden cars and then acts accordingly.

A basic feature of the subject invention is its ability to be mounted in the most advantageous position. In contemporary automobiles, trucks, etc., the device of this invention should preferably be mounted on the outside. Thus the customary rear side rear window panel does not block its viewing range.

Another basic feature of the subject invention is that it is pivoted between two positions. Thus "blind spots" which occur using ordinary side mirrors are alleviated. In the first position, the mirror is adjusted by the driver to the most suitable angle.

When the driver wishes to check his blind spot for any hidden cars, he simply actuates the tilting mechanism of the device. It automatically tilts the mirror to a second position at a predetermined angle relative to the first position and allows him to view his blind spot. This angle is presettable for each particular driver. Upon deactuation, the mirror automatically returns to its first position.

The tilting mechanism consists of an electromechanical solenoid mechanically connected to the pivot post to which the mirror is mounted. Upon actuation, the solenoid pivots the mirror into its far position. Actuation occurs when electrical current is supplied to the solenoid. This can be accomplished in one of many ways. The simplest is a momentary switch (pushbutton) which supplies current only when the switch is closed (button depressed). One advantage of such a momentary switch is that it can be conveniently located anywhere in the vehicle. When the driver wishes to scan his blind spot, he simply presses the switch, views the area, then releases the switch. A quick and easy operation is thereby enabled. Where two devices on both sides of the vehicle are employed, one switch could be used to actuate both devices simultaneously. Thus the driver's blind spots on both sides of his vehicle may be checked.

Current could also be supplied to the device by utilizing the standard directional switch of the vehicle. The directional switch most commonly utilized in contemporary automobiles is a double throw, single pole (DTSP) switch. In turning or passing, the driver "puts on the directional" and such action supplies current to the device of this invention, thereby actuating its operation. After completing the turn, the directional opens the circuit and the mirror automatically returns to its normal position.

The electrical power needed to actuate the solenoid may be supplied by various methods. It could draw current from the automobile battery which is rechargeable by the alternator. Depending on the specifications of the solenoid and the transmitting medium, the current could be converted into a more suitable waveform by various wave shaping electrical components.

A pneumatic solenoid could also be used instead of the electromechanical solenoid referred to above. The vacuum or pressure needed could easily be obtained either from the carburetor of the vehicle or from a vacuum pump operated by the vehicle's motor power.

Another feature of this invention is its simplicity. In contrast to the prior art, this device is constructed from relatively few parts. The structure basically consists of a mounting feature, a solenoid and the mirror. The compactness of the device allows it to be housed in the conventional racing-type mirror housing.

The invention accordingly comprises the features of construction, combination of elements and arrangements of parts which will be exemplified in the construction hereinafter set forth, and the scope of the invention will be indicated in the claims.

For a fuller understanding of the nature and objects of the invention, reference should be had to the following detailed description taken in connection with the accompanying drawing.

BRIEF DESCRIPTION OF THE DRAWING

Similar reference characters refer to similar parts throughout the several views of the drawings.

DESCRIPTION OF THE PREFERRED EMBODIMENTS

Figure 1:
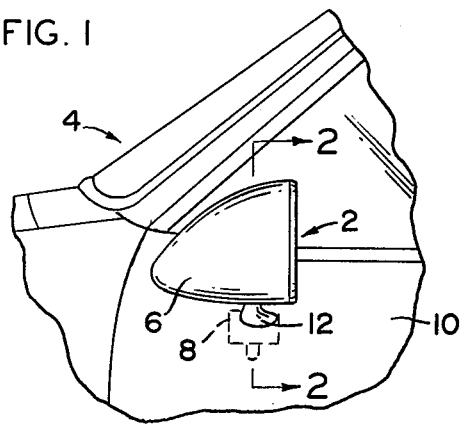
FIG. 1 is a perspective side view of the invention installed on the driver's side of an automobile.

In FIG. 1, the device 2 of this invention is shown positioned on the left or driver's side of the car 4. It is housed in a conventional racing-type mirror housing 6. It is mounted on the car by positioning a reinforcement plate 8 on the inside of the door panel 10 and then threadably connecting the base 12 thereto.

A hollow trunk 14 is the main supportive element of the device 2. It supports the solenoid 16, tilting mechanism and mirror assembly 18. The tilting mechanism, powered by the solenoid, acts as the tilting medium between the solenoid 16 and the mirror assembly 18. The lower portion of the trunk is connected to the base 12 at a pivot point 20. The pivot point 20 allows the entire device 2 to be angled relative to the car door panel 10.

The solenoid 16 is an electromechanical device housed in a cylindrical can 22. The can is securely connected to the trunk by a bracket 24. Electrical current is supplied to the solenoid through the wire 26. Alternately tube 19 supplies pneumatic power or vacuum. A momentary switch or valve (not shown) is positioned inside the car 2 and completes the circuit between the solenoid 16 and the power source such as the car battery or pneumatic power or vacuum (not shown). A return spring 28 is incorporated within the can 22. It forces the core shaft 30 of the solenoid 16 to remain in its inward position until actuation of the solenoid 16.

The mirror assembly 18 of the invention is similar to the standard side mirror commonly found on cars. It consists of a mirror (not shown) housed in a domed-shaped housing 32. The housing 32 is connected to the tilting mechanism by a ball and socket joint 34. Thus the driver may adjust the mirror assembly 18 to his suitable angle.

Figure 4:
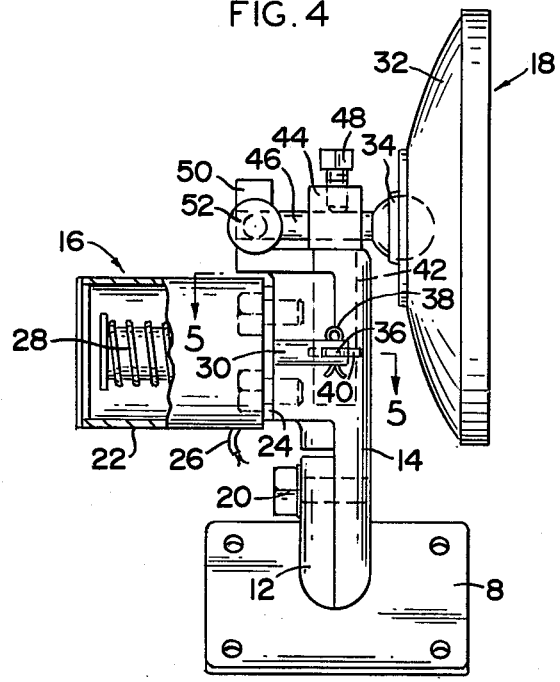
FIG. 4 is a partial cross-sectional side view of the invention.
Figure 5:
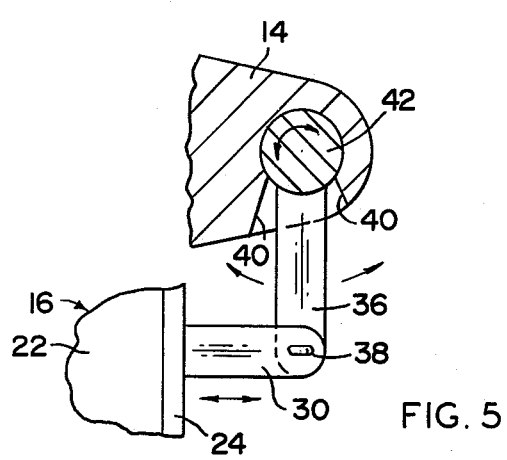
FIG. 5 is a cross-sectional view along lines 5—5 of FIG. 4.

The tilting mechanism consists of mechanical linkages between the solenoid 16 and the mirror assembly 18. One end of a lever arm 36 is pivotly connected by a cotter pin 38 to the core shaft 30 of the solenoid 16. The other end is then securely connected through a slot 40 in the trunk 14 to a post 42 which has been slip-fitted into the cavity of the trunk 14 (see FIGS. 4 & 5). Upon movement of the core shaft 30, the lever arm 36 connected turns the post 42. The upper end of the post 42 consists of a collar portion 44. The collar portion 44 is seated on the top of the trunk 14 and acts as a bushing seat during rotation of the post 42. Another portion of the tilting mechanism consists of a finger 46 securely connected to the ball and socket joint 34 of the mirror assembly 18 (see FIGS. 3 & 4). The finger 46 is inserted through a hole in the collar portion 44 of the post 42 and locked in place by a set screw 48. By this arrangement, the mirror assembly 18 tilts upon rotation of the post 42.

Figure 2:
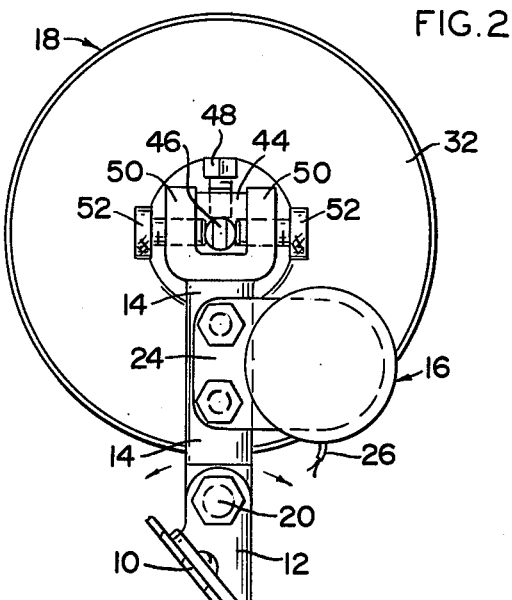
FIG. 2 is a cross-sectional view taken along line 2—2 of FIG. 1.

As noted above, the tilting mechanism tilts the mirror assembly 18 between two presettable positions. This is accomplished by incorporating an upstanding U-shaped protrusion 50 onto the upper portion of the trunk 14 (see FIGS. 2 & 4). The finger 46 which extends through the collar portion 44 of the post 42, ends between the U-shaped protrusion 50. A thumb screw 52 is threaded through each leg of the U-shaped protrusion 50. The distance between the thumb screw 52 is easily adjustable by the driver and determines the degree of tilt. It is also noted that the extreme left tilting position of the mirror assembly 18 is determined by the position of the right thumb screw 52. Likewise, the extreme right position is determined by the left thumb screw 52.

Figure 3:
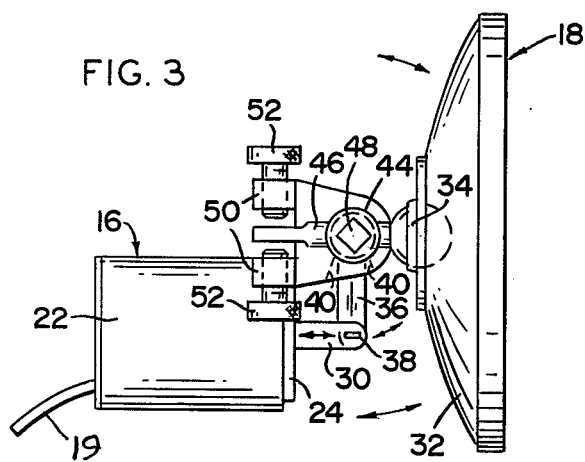
FIG. 3 is a top view of the invention with the housing removed and powered by pneumatic operation.

In the normal inactuated mode, return spring 28 pushes the core shaft 30 outward from the can 22 which keeps the post 42 and likewise the mirror assembly 18 in an extreme counterclockwise portion (see FIG. 3). In this position, the driver adjusts the mirror assembly 18 to his preferred ordinary viewing angle. When the driver wishes to examine his blind spot for any oncoming cars, he simply actuates the solenoid 16 by a switch (not shown) within the vehicle. This completes the circuit of wire 26 to the solenoid 16. Upon such actuation, the core shaft 30 of the solenoid 16 is pulled inwardly into the can 22. Such pulls the lever arm 36 to pivot the mirror assembly 18 to an extreme left portion (FIG. 3). In this position, the driver views his blind spots.

After deactuation, the mirror assembly 18 returns to its normal right portion by means of spring 28.

It will thus be seen that the objects set forth above, among those made apparent from the preceding description, are efficiently attained and, since certain changes may be made in the above article without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which as a matter of language, might be said to fall therebetween.

Now that the invention has been described, what is claimed is:

1. A vehicle mirror angling device comprising in combination:
   base means connectable to the body of the vehicle;
   a mirror;
   pivot means pivotably mounting said mirror to said base means;
   a finger mounted for movement in accordance with said mirror;
   U-shaped slot means secured to said base for receiving said finger therebetween;
   adjustment means coacting between said finger and said U-shaped slot for limiting the movement of said finger within said U-shaped slot between a first and a second position; and
   a solenoid connection for moving said mirror upon activation of said solenoid to tilt the mirror in accordance with the movement established for said finger.

2. The vehicle mirror angling device of claim 1, wherein said solenoid operates electromechanically.

3. The vehicle mirror angling device of claim 1, wherein said solenoid is a pneumatic device.

4. The vehicle mirror angling device of claim 1, wherein said pivot means comprises a post rotatably fitted into a trunk secured to said base means.

5. The vehicle mirror angling device of claim 4, including a lever secured to said post and extending through a slot in said trunk; and
   means for pivotably connecting said lever to the core shaft of said solenoid for rotating said post upon actuation of said solenoid.

6. The vehicle mirror angling device of claim 1, wherein said adjustment means comprises threaded means threadably receivable in one of said U-shaped slot means and said finger for limiting the movement of said finger upon contact with the other of said U-shaped slot means and said finger.

7. A vehicle mirror angling device of claim 6, wherein said threaded means comprises a first and a second screw extending from opposed sides of said U-shaped slot for establishing said first and second positions.

8. A vehicle mirror angling device of claim 1, wherein said mirror is adjustable mounted to said finger by ball and socket means.

* * * * *